US011450157B2

(12) United States Patent
Itzkovich

(10) Patent No.: US 11,450,157 B2
(45) Date of Patent: Sep. 20, 2022

(54) METHOD AND SYSTEM FOR BUNDLING AUTOMOTIVE DATA

(71) Applicant: OTONOMO TECHNOLOGIES LTD., Even Yehuda (IL)

(72) Inventor: Yosef Haim Itzkovich, Raanana (IL)

(73) Assignee: OTONOMO TECHNOLOGIES LTD., Even Yehuda (IL)

( * ) Notice: Subject to any disclaimer, the term of this patent is extended or adjusted under 35 U.S.C. 154(b) by 333 days.

(21) Appl. No.: 16/848,251

(22) Filed: Apr. 14, 2020

(65) Prior Publication Data

US 2020/0327750 A1 Oct. 15, 2020

Related U.S. Application Data

(60) Provisional application No. 62/833,709, filed on Apr. 14, 2019.

(51) Int. Cl.
*G07C 5/08* (2006.01)
*H04W 4/46* (2018.01)
*G07C 5/00* (2006.01)
*G06N 20/00* (2019.01)

(52) U.S. Cl.
CPC .......... *G07C 5/0841* (2013.01); *G06N 20/00* (2019.01); *G07C 5/008* (2013.01); *H04W 4/46* (2018.02)

(58) Field of Classification Search
CPC ....... G07C 5/0841; G07C 5/008; H04W 4/46; G06N 20/00
See application file for complete search history.

(56) References Cited

U.S. PATENT DOCUMENTS

| | | | | |
|---|---|---|---|---|
| 8,856,187 | B2 * | 10/2014 | Kanamatareddy | G06F 16/22 707/802 |
| 2002/0087271 | A1 * | 7/2002 | Rozenshtein | G06F 16/2358 707/E17.007 |
| 2005/0080635 | A1 * | 4/2005 | Groff | G06Q 30/06 705/26.1 |
| 2007/0280469 | A1 * | 12/2007 | Baker | H04M 3/44 379/350 |
| 2014/0282493 | A1 * | 9/2014 | Glover | G06F 8/76 707/706 |
| 2017/0070616 | A1 * | 3/2017 | DiMeo | H04W 4/50 |
| 2017/0364534 | A1 * | 12/2017 | Zhang | G06F 16/284 |
| 2018/0034862 | A1 * | 2/2018 | Friend | H04L 65/105 |
| 2018/0276907 | A1 * | 9/2018 | Solazzo | B60W 50/045 |
| 2019/0107815 | A1 * | 4/2019 | Miller | G06F 16/25 |
| 2019/0205727 | A1 * | 7/2019 | Lin | G06N 3/006 |

(Continued)

*Primary Examiner* — Dominic E Rego

(74) *Attorney, Agent, or Firm* — Pearl Cohen Zedek Latzer Baratz LLP

(57) ABSTRACT

A system and a method for bundling data features relating to connected vehicles, in accordance with respective use cases are provided herein. The method may include the following steps: obtaining a plurality of data features relating to connected vehicles originated from a plurality of data sources; maintaining a use cases database, holding a plurality of use cases, each affiliated with a respective blend of said data features; receiving one or more requests from clients for data features, each request associated with respective business requirements; and providing said clients with a respective one of said bundles according to the respective business requirements and responsive to the requests and based on the use cases database.

18 Claims, 3 Drawing Sheets

(56) References Cited

U.S. PATENT DOCUMENTS

2019/0236680 A1\* 8/2019 Kounine ................ G06N 20/00
2020/0056892 A1\* 2/2020 Haque .................. G06K 9/6273
2020/0321083 A1\* 10/2020 Vergetis ................ G06N 20/00

\* cited by examiner

METHOD AND SYSTEM FOR BUNDLING AUTOMOTIVE DATA

CROSS-REFERENCE TO RELATED APPLICATION

This Application claims the benefit of and priority to U.S. Provisional Patent Application No. 62/833,709, filed on Apr. 14, 2019, which is incorporated herein by reference in its entirety and is co-owned by the Assignee of the instant application

FIELD OF THE INVENTION

The present invention relates generally to the field of data processing and, more particularly, to processing of automotive data over a computer network.

BACKGROUND OF THE INVENTION

Prior to setting forth the background of the invention, it may be helpful to provide herein definitions of certain terms that will be used hereinafter.

The term "connected vehicle" as used herein is defined as a car or any other motor vehicle, such as a drone or an aerial vehicle, that is equipped with any form of wireless network connectivity enabling it to provide and collect data from the wireless network. The data originated from and related to connected vehicles and their parts is referred herein to as "automotive data".

The term "data marketplace" or "data market" as used herein is defined as an online computerized platform that enables a plurality of data consumers to access and consume data. Data marketplaces typically offer various types of data for different markets and from different sources. Common types of data consumers of the automotive data marketplace may include the following domains: financial and insurance institutions, entertainment and navigation applications, safety and emergency, demography and research and many more.

Automotive data consumed in these marketplaces may be used by businesses of all kinds, fleets, business and safety applications, and many types of analysts. Data marketplaces have proliferated with the growth of big data, as the amount of data collected by municipalities and smart cities, businesses, websites and services has increased, and all that data has become increasingly recognized as an asset.

One of the challenges in managing a marketplace for vehicle related data is to enable customer access to data sources and effectively use the data obtained from the sensors they need. The challenge is both from a technical and a business point of view. It is usually not clear to data consumers (subscribers) what access to what sensors they would need and in what format that data is needed in order to optimize their use of the data they consume, for their own purposes.

Another challenge is to manage the various consent requirements affiliated with various data sources (e.g., sensors) in terms of sharing the data with potential data consumers.

Matching between data sources and sensors, with the data consumers may become a very difficult task, especially if carried out on a sensor-by-sensor approach. Such a sensor-by-sensor approach is also difficult to implement, as it is difficult to enforce policies, difficult to bill consumers per sensor and difficult to address the variance in using same sensors for different use case at the data consumer side.

SUMMARY OF THE INVENTION

In order to address the challenges, it has been suggested by the inventor of the present application to introduce automotive data features bundling. In accordance with some embodiments of the present invention, a data features bundle is a list of attributes that form a subset of data features in a predefined blend that is sufficient for serving as a basis for implementing a specified use case.

Some embodiments of the present invention relate to a method of bundling data features relating to connected vehicles, in accordance with respective use cases. The method may include the following steps: obtaining a plurality of data features relating to connected vehicles originated from a plurality of data sources; maintaining a use cases database, holding a plurality of use cases, each affiliated with a respective blend of said data features; receiving one or more requests from clients for data features, each request associated with respective business requirements; and providing said clients with a respective one of said bundles according to the respective business requirements and responsive to the requests and based on the use cases database. In accordance with some embodiments of the present invention, the aforementioned steps may be implemented on a computer server, as part of a client-server network.

BRIEF DESCRIPTION OF THE DRAWINGS

The subject matter regarded as the invention is particularly pointed out and distinctly claimed in the concluding portion of the specification The invention, however, both as to organization and method of operation, together with objects, features, and advantages thereof, may best be understood by reference to the following detailed description when read with the accompanying drawings in which:

Figure 1:
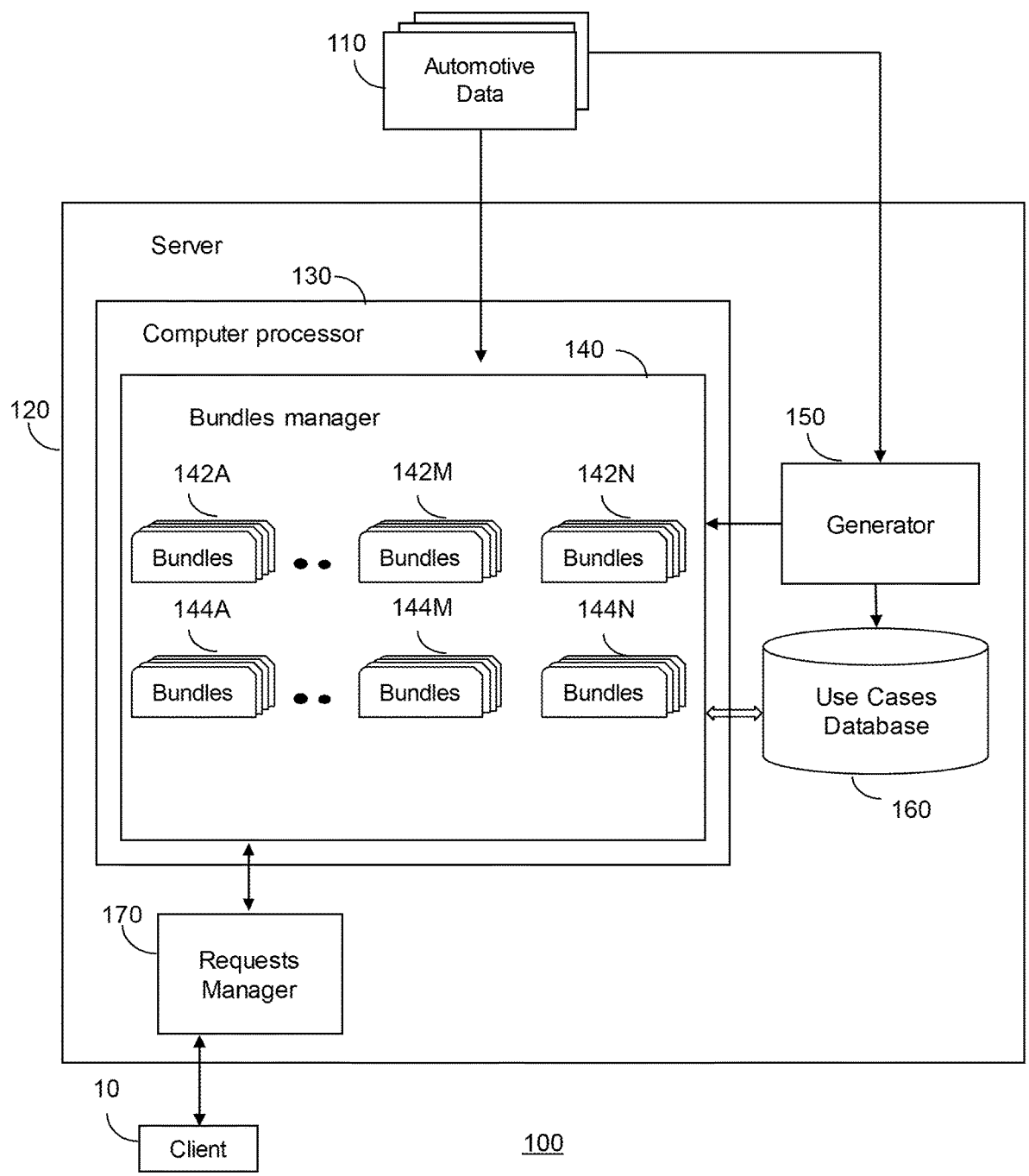
FIG. 1 is a block diagram illustrating non-limiting exemplary architecture of a marketplace server that is capable of bundling of data relating to connected-cars in accordance with some embodiments of the present invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention However, it will also be apparent to one skilled in the art that the present invention may be practiced without the specific details presented herein. Furthermore, well known features may be omitted or simplified in order not to obscure the present invention Unless specifically stated otherwise, as is apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

FIG. 1 is a block diagram illustrating non-limiting exemplary architecture of system 100 for bundling data features relating to connected vehicles, in accordance with respective use cases. The system may include: a server 120 configured to obtain a plurality of data features relating to connected vehicles originated from a plurality of data sources holding automotive data 110. System 100 may further include a use cases database 160, configured to hold a plurality of use cases, each affiliated with a respective blend of said data features.

System 100 may include a bundle manager 140 implemented by a computer processor 130 configured to store a plurality of data features bundles, wherein each bundle is a list of attributes that form a subset of data features that is sufficient (in terms of data sufficiency) to implement one of said use cases and to receive one or more requests via a requests manager 170 from one or more clients 10 for data features, each request being associated with one or more respective business requirements. The bundle manager 140 provides said clients with a respective one of said bundles 144A-144N according to the one or more respective business requirements and responsive to the requests and based on the use cases database 160.

According to some embodiments of the present invention, system 100 may further include a bundles generator 250 configured to generate bundles 144A-144N prior to receiving the requests.

According to some embodiments of the present invention, system 100 may further include a bundles generator 150 configured to generate bundles on-the-fly based on pre-defined rules, responsive to receiving the requests.

According to some embodiments of the present invention, system 100 may further include a bundles generator 150 configured to generate bundles based on market research.

According to some embodiments of the present invention, system 100 may further include a bundles generator 150 configured to generate bundles using machine learning.

According to some embodiments of the present invention, bundles 144A-144N may include and exhibit a respective blend of data features, wherein the blend administers at least one of types, formats, accuracy, frequency, latency, and sufficiency of the data features.

Several non-limiting exemplary bundles are shown below with their bundled attributes respectively:
  A bundle for UBI-PAYD (User Based Insurance-Pay As You Drive)-Attributes: VIN Time, odometer.
  A bundle for UBI-PAHYD (User Based Insurance-Pay As How You Drive) Attributes: VIN, Time, odometer, speed, acceleration, hard break, latitude, longitude.
  A bundle for Emergency (Upon Accident) Attributes: VIN, Time, latitude, longitude, speed.

The use of bundles in accordance with some embodiments of the present invention may facilitate the matching between available providers that qualify the use case. It will also facilitate and simplify the consent seeking process as the consent shall be now given get per use case and not per attribute within a use case.

In accordance with some embodiments of the present invention, each bundle may have, by nature, its own quality and frequency characteristics. In addition, several similar bundles can be used to cover a more specific need. The scope of the bundle can be broadened or narrowed per the needs of the client.

In accordance with some embodiments of the present invention, for a bundle that supports Emergency Basic (Upon Accident), the attributes can be: VIN, Time, latitude, longitude, speed. For a more comprehensive bundle of Emergency Detailed (Upon Accident), the attributes may include: VIN, Time, latitude, longitude, speed, number of passengers, and airbags.

Additionally, each bundle may support different types of API indicating whether the API is "must" or "optional" per bundle. For example, The APIs may take the form of REST—basic. Reports—optional, Push notification—optional, Insights—optional, and Pre-defined aggregations tables—Optional.

Figure 2:
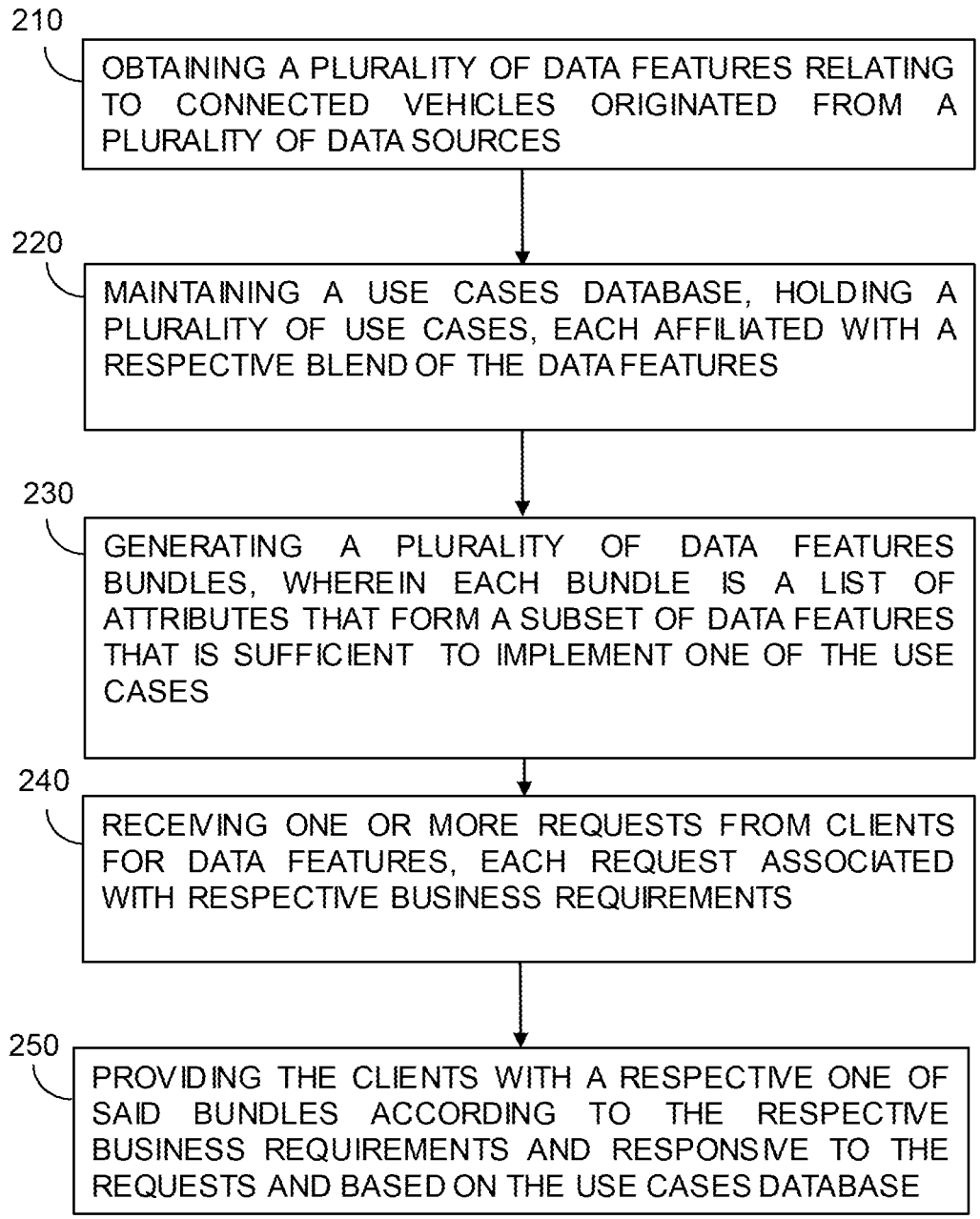
FIG. 2 is a high-level flowchart illustrating non-limiting exemplary method in accordance with some embodiments of the present invention.

FIG. 2 is a high-level flowchart illustrating non-limiting exemplary method in accordance with some embodiments of the present invention. A method for bundling data features relating to connected vehicles, in accordance with respective use cases, is provided herein. Method 200 may include the following steps: obtaining a plurality of data features relating to connected vehicles originated from a plurality of data sources 210; maintaining a use cases database, holding a plurality of use cases, each affiliated with a respective blend of said data features 220; obtaining a plurality of data features bundles, wherein each bundle is a list of attributes that form a subset of data features that is sufficient to implement one of said use cases 230; receiving one or more requests from clients for data features, each request being associated with respective business requirements 240; and providing said clients with a respective one of said bundles according to the respective business requirements and responsive to the requests and based on the use cases database 250.

It should be noted that method 200 according to some embodiments of the present invention may be stored as instructions in a computer readable medium to cause processors, such as central processing units (CPU) to perform the method. Additionally, the method described in the present disclosure can be stored as instructions in a non-transitory computer readable medium, such as storage devices which may include hard disk drives, solid state drives, flash memories, and the like. Additionally, non-transitory computer readable medium can be memory units.

Figure 3:
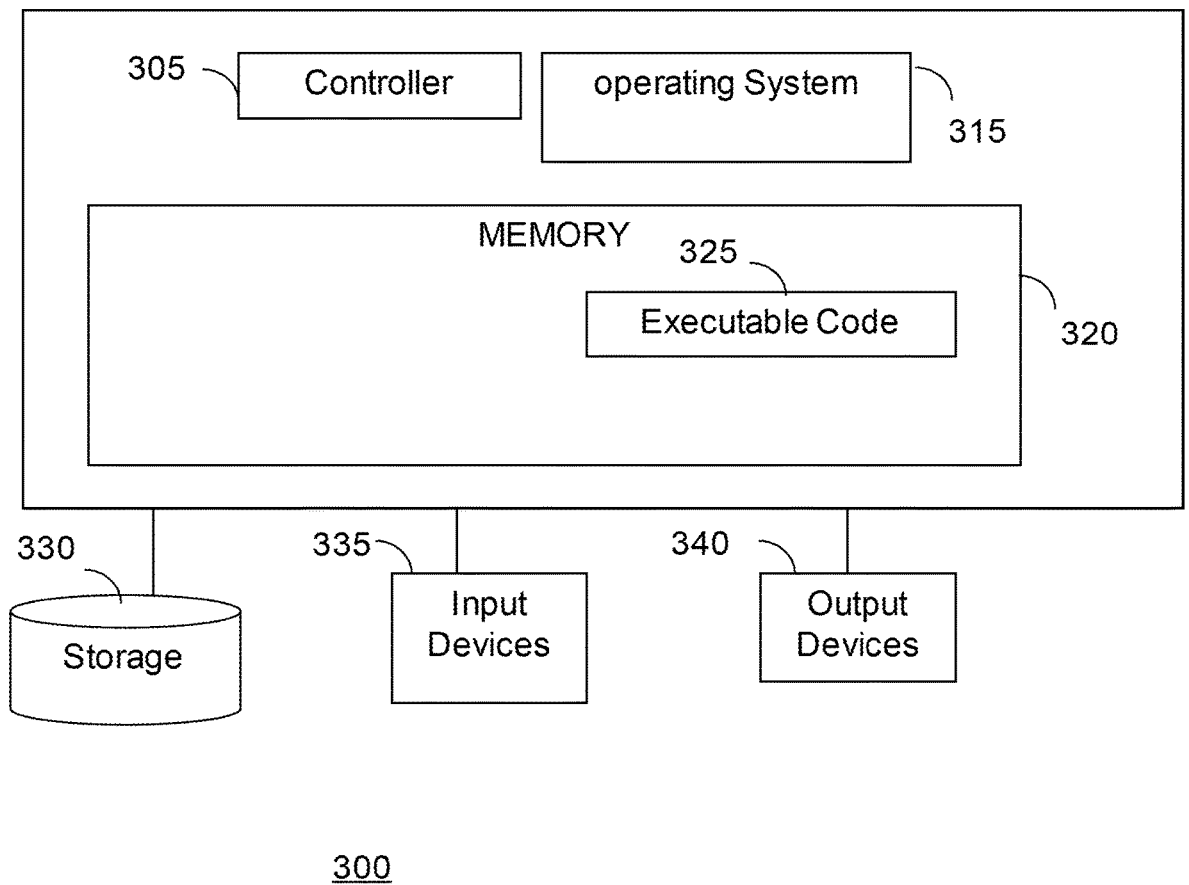
FIG. 3 is a block diagram illustrating non-limiting exemplary architecture of a networked server that runs on one more computer processors in accordance with some embodiments of the present invention.

FIG. 3 is a block diagram illustrating non-limiting exemplary architecture of a networked server that runs on one more computer processors in accordance with some embodiments of the present invention.

In accordance with some embodiments of the present invention, an automotive data marketplace that offers data consumers with automotive data features bundling may be presented as a Computing device 300 which can be used with embodiments of the invention. Computing device 300 can include a controller or processor 305 that can be or include, for example, one or more central processing unit processor(s) (CPU), one or more Graphics Processing Unit(s) (GPU or GPGPU), a chip or any suitable computing or computational device, an operating system 315, a memory 320, a storage 330, input devices 335 and output devices 340.

Operating system 315 can be or can include any code segment designed and/or configured to perform tasks involving coordination, scheduling, arbitration, supervising, controlling or otherwise managing operation of computing device 300, for example, scheduling execution of programs. Memory 320 can be or can include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 320 can be or can include a plurality of possibly different memory units. Memory 320 can store for example, instructions to carry out a method (e.g. code 325), and/or data such as user responses, interruptions, etc.

Executable code 325 can be any executable code, e.g., an application, a program, a process, task or script. Executable code 325 can be executed by controller 305 possibly under control of operating system 415. For example, executable code 325 can when executed cause masking of personally identifiable information (PII), according to some embodiments of the invention In some embodiments, more than one computing device 300 or components of device 300 can be used for multiple functions described herein. For the various modules and functions described herein, one or more computing devices 300 or components of computing device 300 can be used. Devices that include components similar or different to those included in computing device 300 can be used and can be connected to a network and used as a system. One or more processor(s) 305 can be configured to carry out embodiments of the invention by for example executing software or code. Storage 330 can be or can include, for example, a hard disk drive, a Compact Disk (CD) drive, a CD-Recordable (CD-R) drive, a universal serial bus (USB) device or other suitable removable and/or fixed storage unit. Data such as instructions, code, NN model data, parameters, etc. can be stored in a storage 330 and can be loaded from storage 330 into a memory 320 where it can be processed by controller 305.

Input devices 335 can be or can include for example a mouse, a keyboard, a touch screen or pad or any suitable input device. It will be recognized that any suitable number of input devices can be operatively connected to computing device 300 as shown by block 335. Output devices 340 can include one or more displays, speakers and/or any other suitable output devices. It will be recognized that any suitable number of output devices can be operatively connected to computing device 300 as shown by block 340. Any applicable input/output (I/O) devices can be connected to computing device 300, for example, a wired or wireless network interface card (NIC), a modem, printer or facsimile machine, a universal serial bus (USB) device or external hard drive can be included in input devices 335 and/or output devices 340.

Some embodiments of the invention can include one or more article(s) (e.g., memory 320 or storage 330) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Although embodiments of the invention are not limited in this regard, discussions utilizing terms such as, for example, "processing", "computing", "calculating", "determining", "establishing", "analyzing", "checking", or the like, can refer to operation(s) and/or process(es) of a computer, a computing platform, a computing system, or other electronic computing device, that manipulates and/or transform data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by an apparatus and can be implemented as special propose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example. both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks. CD-ROM, and/or DVD-ROM disks. The processor and the memory can be supplemented by, and/or incorporated in special purpose logic circuitry.

To provide for interaction with a user, the above described techniques can be implemented on a computer having a display device, a transmitting device, and/or a computing device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The computing device can include, for example, a computer, a computer with a browser device, a telephone, an IP phone, a mobile device (e.g., cellular phone, personal digital assistant (PDA) device, laptop computer, electronic mail device), and/or other communication devices. The computing device can be, for example, one or more computer servers. The computer servers can be, for example, part of a server farm. The browser device includes, for example, a computer (e.g., desktop computer, laptop computer, and tablet) with a World Wide Web browser (e.g., Microsoft® Internet Explorer® available from Microsoft Corporation, Chrome available from Google, Mozilla® Firefox available from Mozilla Corporation, Safari available from Apple). The mobile computing device includes, for example, a personal digital assistant (PDA).

Website and/or web pages can be provided, for example, through a network (e.g., Internet) using a web server. The web server can be, for example, a computer with a server module (e.g., Microsoft® Internet Information Services available from Microsoft Corporation, Apache Web Server available from Apache Software Foundation, Apache Tomcat Web Server available from Apache Software Foundation).

The storage module can be, for example, a random access memory (RAM) module, a read only memory (ROM) module, a computer hard drive, a memory card (e.g., universal serial bus (USB) flash drive, a secure digital (SD) flash card), and/or any other data storage device. Information stored on a storage module can be maintained, for example, in a database (e.g., relational database system, flat database system) and/or any other logical information storage mechanism.

The above-described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The above described networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth®, code-division multiple access (CDMA) network, time division multiple access (TDMA) network, global system for mobile communications (GSM) network), and/or other circuit-based networks.

Some embodiments of the present invention may be embodied in the form of a system, a method or a computer program product. Similarly, some embodiments may be embodied as hardware, software or a combination of both Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with embodiments. In some embodiments, the instructions stored on the computer readable medium may be in the form of an installed application and in the form of an installation package.

Such instructions may be, for example, loaded by one or more processors and get executed. For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

One skilled in the art will realise the invention may be embodied in other specific forms without departing from the spirit or essential characteristics thereof The foregoing embodiments are, therefore, to be considered in all respects illustrative rather than limiting of the invention described herein. Scope of the invention is thus indicated by the appended claims, rather than by the foregoing description, and all changes that cone within the meaning and range of equivalency of the claims are therefore intended to be embraced therein.

In the foregoing detailed description, numerous specific details are set forth in order to provide an understanding of the invention However, it will be understood by those skilled in the art that the invention can be practiced without these specific details. In other instances, well-known methods, procedures, and components, modules, units and/or circuits have not been described in detail so as not to obscure the invention Some features or elements described with respect to one embodiment can be combined with features or elements described with respect to other embodiments.

The invention claimed is:

1. A method of bundling data features relating to connected vehicles, in accordance with respective use cases, the method comprising:
   obtaining a plurality of data features relating to connected vehicles originated from a plurality of data sources;
   maintaining a use cases database, holding a plurality of use cases, each affiliated with a respective blend of said data features;
   generating a plurality of data features bundles, wherein each bundle is a list of attributes that form a subset of data features that is sufficient to implement one of said use cases;
   receiving one or more requests from clients for data features, each request associated with one or more respective business requirements; and
   providing said clients with a respective one of said data features bundles, according to the respective one or more business requirements and responsive to the requests and based on the use cases database.

2. The method according to claim 1, wherein said data features bundles are pre-generated prior to receiving the requests.

3. The method according to claim 1, wherein said data features bundles are generated on-the-fly based on predefined rules, responsive to receiving the requests.

4. The method according to claim 1, wherein said data features bundles are generated based on market research.

5. The method according to claim 1, wherein said data features bundles are generated using machine learning.

6. The method according to claim 1, wherein said data features bundles comprise a respective blend of data features, wherein the blend administers at least one of types, formats, accuracy, frequency, latency, and sufficiency of the data features.

7. A system for bundling data features relating to connected vehicles, in accordance with respective use cases, the system comprising:
   a server configured to obtain a plurality of data features relating to connected vehicles originated from a plurality of data sources;
   a use cases database, configured to hold a plurality of use cases, each affiliated with a respective blend of said data features; and
   a bundle manager implemented by a computer processor configured to:
      store a plurality of data features bundles, wherein each bundle is a list of attributes that form a subset of data features that is sufficient to implement one of said use cases; and
      receive one or more requests from clients for data features, each request associated with respective business requirements; and
      provide said clients with a respective one of said bundles according to the respective business requirements and responsive to the requests and based on the use cases database.

8. The system according to claim 7, farther comprising a bundles generator wherein said bundles generator is configured to generate said data features bundles prior to receiving the requests.

9. The system according to claim 7, further comprising a bundles generator wherein said bundles generator is configured to generate said data features bundles on based on predefined rules, responsive to receiving the requests.

10. The system according to claim 7, further comprising a bundles generator wherein said bundles generator is configured to generate said data features bundles based on market research.

11. The method according to claim 7, further comprising a bundles generator wherein said bundles generator is configured to generate said data features bundles using machine learning.

12. The system according to claim 7, wherein said data features bundles comprise a respective blend of data features, wherein the blend administers at least one of types, formats, accuracy, frequency, latency, and sufficiency of the data features.

13. A non-transitory computer readable storage medium for bundling data features relating to connected vehicles, in accordance with respective use cases, the computer readable storage medium comprising a set of instructions that, when executed, cause at least one computer processor to:
   obtain a plurality of data features relating to connected vehicles originated from a plurality of data sources;
   hold a plurality of use cases, each affiliated with a respective blend of said data features;
   store a plurality of data features bundles, wherein each bundle is a list of attributes that form a subset of data features that is sufficient to implement one of said use cases; and
   receive one or more requests from clients for data features, each request associated with respective business requirements; and
   provide said clients with a respective one of said bundles according to the respective business requirements and responsive to the requests and based on the use cases database.

14. The non-transitory computer readable storage medium according to claim 13, further comprising a set of instructions that, when executed, cause the at least one computer processor to generate said data features bundles prior to receiving the requests.

15. The non-transitory computer readable storage medium according to claim 13, further comprising a set of instructions that, when executed, cause the at least one computer processor to generate said data features bundles on-the-fly based on predefined rules, responsive to receiving the requests.

16. The non-transitory computer readable storage medium according to claim 13, further comprising a set of instructions that, when executed, cause the at least one computer processor to generate said data features bundles based on market research.

17. The non-transitory computer readable storage medium according to claim 13, further comprising a set of instructions that, when executed, cause the at least one computer processor to generate said data features bundles using machine learning.

18. The non-transitory computer readable storage medium according to claim 13, wherein said data features bundles comprise a respective blend of data features, wherein the blend administers at least one of types, formats, accuracy, frequency, latency, and sufficiency of the data features.

* * * * *